United States Patent
Hedman

(10) Patent No.: US 9,702,460 B2
(45) Date of Patent: Jul. 11, 2017

(54) VEHICLE TRANSMISSION AND A METHOD FOR OPERATING A VEHICLE TRANSMISSION

(71) Applicant: VOLVO TRUCK CORPORATION, Göteborg (SE)

(72) Inventor: Anders Hedman, Marstrand (SE)

(73) Assignee: Volvo Truck Corporation, Göteborg (SE)

( * ) Notice: Subject to any disclaimer, the term of this patent is extended or adjusted under 35 U.S.C. 154(b) by 27 days.

(21) Appl. No.: 14/892,105

(22) PCT Filed: Jun. 11, 2013

(86) PCT No.: PCT/EP2013/001701
§ 371 (c)(1),
(2) Date: Nov. 18, 2015

(87) PCT Pub. No.: WO2014/198280
PCT Pub. Date: Dec. 18, 2014

(65) Prior Publication Data
US 2016/0116062 A1    Apr. 28, 2016

(51) Int. Cl.
*F16H 59/72*    (2006.01)
*F16H 61/70*    (2006.01)
(Continued)

(52) U.S. Cl.
CPC .......... *F16H 61/702* (2013.01); *F16D 48/062* (2013.01); *F16H 3/006* (2013.01);
(Continued)

(58) Field of Classification Search
CPC .... F16H 61/702; F16H 61/0204; F16H 59/72; F16H 57/0441; F16H 57/0494;
(Continued)

(56) References Cited

U.S. PATENT DOCUMENTS 6,044,931 A * 4/2000 Reed, Jr. ................ F16H 3/006
 184/6.12
6,397,692 B1 * 6/2002 Carriere ................. F16H 3/093
 74/331
(Continued)

FOREIGN PATENT DOCUMENTS

DE       4115989       11/1992
WO    2011069526 A1    6/2011

OTHER PUBLICATIONS

International Search Report (Feb. 26, 2014) for corresponding International App. PCT/EP2013/001701.

*Primary Examiner* — Roger Pang
(74) *Attorney, Agent, or Firm* — WRB-IP LLP

(57) ABSTRACT

A vehicle transmission includes a first transmission mechanism arranged to transmit mechanical driving power from an output shaft of the prime mover to a first input shaft and to put any one of a first set of gears in an engaged state to drivingly connect the first input shaft to the driving wheels; and a second transmission mechanism arranged to transmit mechanical driving power from the output shaft of the prime mover to a second input shaft and to put any one of a second set of gears in an engaged state to drivingly connect the second input shaft to the driving wheels. Controllable first and second clutch units are arranged to bring the output shaft of the prime mover and the first and the input shaft, respectively, into engagement with each other. A lubrication pump is drivingly connected to the first input shaft to lubricate the transmission and an electronic control unit is arranged to determine a lubricated state of the transmission and the operational state of the lubrication pump. When the first clutch unit is engaged to connect the output shaft of the prime mover to the first input shaft, the lubrication pump is driven by the first input shaft. When the second clutch unit is engaged to connect the output shaft of the prime mover to (Continued)

the second input shaft, the lubrication pump is arranged to be driven by the first input shaft by at least partly engaging the first clutch unit.

24 Claims, 4 Drawing Sheets

(51) Int. Cl.
*F16H 61/00* (2006.01)
*F16H 61/688* (2006.01)
*F16H 3/00* (2006.01)
*F16H 57/04* (2010.01)
*F16D 48/06* (2006.01)
*F16H 61/02* (2006.01)
*B60W 10/113* (2012.01)
*B60W 10/02* (2006.01)
*F16H 3/08* (2006.01)
*F16D 48/02* (2006.01)

(52) U.S. Cl.
CPC ..... *F16H 57/0441* (2013.01); *F16H 57/0494* (2013.01); *F16H 59/72* (2013.01); *F16H 61/0021* (2013.01); *F16H 61/0204* (2013.01); *F16H 61/688* (2013.01); *B60W 10/023* (2013.01); *B60W 10/113* (2013.01); *F16D 2048/0245* (2013.01); *F16D 2500/1112* (2013.01); *F16D 2500/3056* (2013.01); *F16D 2500/3058* (2013.01); *F16D 2500/30401* (2013.01); *F16D 2500/7041* (2013.01); *F16D 2500/70426* (2013.01); *F16H 2003/0807* (2013.01); *F16H 2061/0037* (2013.01); *Y10T 477/6395* (2015.01)

(58) Field of Classification Search
CPC .... F16H 3/006; F16H 61/0025; F16H 61/688; F16H 2003/0807; F16H 2061/0037; F16D 48/062; F16D 2500/70426; F16D 2500/3056; F16D 2500/7041; F16D 2500/3058; F16D 2500/30401; B60W 10/113; B60W 10/023; Y10T 477/6395
See application file for complete search history.

(56) References Cited

U.S. PATENT DOCUMENTS

| | | | |
|---|---|---|---|
| 2011/0198139 A1* | 8/2011 | Fuechtner | B60K 6/48 180/65.25 |
| 2011/0306456 A1* | 12/2011 | Mellet | F16H 3/006 475/198 |
| 2012/0125731 A1* | 5/2012 | Mohr | F16D 13/72 192/84.1 |
| 2012/0322603 A1 | 12/2012 | Kuroda et al. | |
| 2016/0318392 A1* | 11/2016 | Kowalsky | B60K 23/08 |

* cited by examiner

VEHICLE TRANSMISSION AND A METHOD FOR OPERATING A VEHICLE TRANSMISSION

BACKGROUND AND SUMMARY

The invention relates to an arrangement and a method for driving a lubrication pump in a dual clutch transmission.

Commercial vehicles can be provided with a dual-clutch transmission (DCT) having two individually controllable master clutches, each associated with a set of gears. Usually, one clutch is used for odd gears (gears 1, 3, 5, etc.), while the other clutch is used for even gears (gears 2, 4, 5, etc.). For lubrication and cooling of a DCT an oil pump is needed, which pump is usually mechanically driven. In operation, one clutch is engaged, or active, and transfers power, while the other clutch is disengaged, or inactive. A gear associated with the inactive clutch can be engaged, allowing a gear to be preselected prior to being active. A gear shift is performed by simultaneously disengaging the active clutch and engaging the inactive clutch. This enables power-shifting between gears, that is, there is no interruption of power being transferred to the driven wheels.

Some DCT designs feature a direct gear, where the input shaft is clutched to the output shaft and the power is not transferred via any gear meshes. This will reduce the power losses to a large extent. Since gear meshes and bearings are not loaded in the direct gear, the need for lubricating and cooling oil flow will be reduced. In this mode of operation, the oil pump is driven by the direct gear via the engaged clutch at a speed proportional to the prime mover (e.g. engine) speed. A problem with this solution is that the pump is operated at a higher speed than necessary, which is a waste of energy.

An alternative solution is to use an electrically driven lubrication pump, as shown in US2012/322603. This makes the pump independent of the prime mover speed and clutch actuation, but requires an additional electric motor. The use of a separate motor for this purpose adds weight and cost and introduces durability and reliability issues.

It is desirable to provide an improved arrangement for driving a lubrication pump in a dual clutch transmission that solves or minimizes the above problems.

In the subsequent text, the term "clutch unit" is intended to describe a clutch arrangement comprising a rotatable friction plate, friction elements, actuators and other peripherals required for a vehicle clutch assembly. Furthermore, in the subsequent text, the terms "lubricated", "lubricating" and "lubrication" shall be read in the context of lubrication per se, i.e., for reducing friction and wear, as well as for cooling, i.e., removing heat from components.

According to a preferred embodiment, an aspect of the invention relates to a vehicle transmission in a vehicle which comprises at least one prime mover, e.g., an internal combustion engine and/or an electric motor. The prime mover can be arranged to propel a vehicle with suitable ground engaging members, such as wheels or tracks. The examples given below refer to driving wheels only.

The transmission comprises a first transmission mechanism arranged to transmit mechanical driving power from an output shaft of the prime mover to a first input shaft and to put any one of a first set of gears in an engaged state to drivingly connect the first input shaft to the driving wheels. The transmission further comprises a second transmission mechanism arranged to transmit mechanical driving power from the output shaft of the prime mover to a second input shaft and to put any one of a second set of gears in an engaged state to drivingly connect the second input shaft to the driving wheels. A controllable first clutch unit is arranged to bring the output shaft of the prime mover and the first input shaft into engagement with each other. Similarly, a controllable second clutch unit is arranged to bring the output shaft of the prime mover and the second input shaft into engagement with each other. A lubrication pump for lubricating the transmission is drivingly connected to the first input shaft. In the subsequent text this lubrication pump can also be referred to as a "pump".

An electronic control unit is arranged to control the operation of the transmission. The electronic control unit is further arranged to register the operational state of the lubrication pump, i.e. if the pump is currently driven or not, and to determine a lubricated state of the transmission. i.e. if lubrication is required or not. When the first clutch unit is engaged to drivingly connect the output shaft of the prime mover to the first input shaft and the driving wheels, the lubrication pump is driven by the first input shaft. In this case lubrication of the transmission is being carried out as normal and the pump speed is proportional to the rotational speed of the first input shaft and the output shaft of the prime mover.

However, when the second clutch unit is engaged to drivingly connect the output shaft of the prime mover to the second input shaft and the driving wheels, then the first input shaft and the associated lubrication pump are not driven by the output shaft of the prune mover. The electronic control unit is arranged to register the operational state of the first and second clutches and the lubrication pump. When it is registered that the second clutch unit is engaged, the electronic control unit can be arranged to at least partly engaging the first clutch unit, in order to drive the first input shaft and the lubrication pump.

The electronic control unit is also arranged to determine the lubricated state of the transmission. If the electronic control unit determines that the lubricated state of the transmission or a part thereof is insufficient, then the lubrication pump is driven by the first input shaft by at least partly engaging the first clutch unit. The electronic control unit can be connected to at least one of a number of existing sensors (not shown) for detecting and monitoring the lubrication of each clutch unit and the shafts and gears of the transmission. Examples of sensors are temperature sensors for measuring oil temperature and/or bearing temperature, oil level sensors for monitoring oil levels, oil pressure sensors for monitoring oil pressure, as well as other suitable sensors allowing the electronic control unit to determine the lubricated state of the transmission. These sensors can be arranged to monitor the said parameters in one or more locations and to transmit signals to the electronic control unit.

According to a first example, the first clutch unit is arranged to be partly engaged in a continuous slipping operation to drive the pump. The electronic control writ can be arranged to control the degree of slip in response to the determined lubricated state of the transmission, allowing the pump to be driven at variable speed depending on the lubrication requirement. Alternatively the electronic control unit can control the degree of slip to drive the pump at a predetermined, fixed speed.

According to a second example, the first clutch unit is arranged to be engaged intermittently to drive the pump. The electronic control unit can be arranged to control the rate of intermittent operation, that is, the duration and/or the frequency of clutch actuation, in response to the determined lubricated state of the transmission. The flow of lubricant supplied by the pump can be varied by control of the duration and/or frequency of clutch actuation.

In these examples the flow of lubricant supplied by the pump is reduced, in relation to normal operation, as the pump is being driven by partly engaging the inactive clutch. The vehicle transmission used in these examples is preferably a dual-clutch transmission.

The lubrication pump is arranged to be driven by the first input shaft by at least partly engaging the first clutch unit when the second clutch unit is engaged to drivingly connect the second input shaft to the driving wheels. In addition to normal dual-clutch operation where the first and second clutch units are used for gear shifting or power shifting, the invention is also applicable when the second clutch unit is engaged to connect the second input shaft to the driving wheels in a direct gear. In this example the electronic control unit is arranged to at least partly engaging the first clutch unit, in order to drive the first input shaft and the lubrication pump when the direct gear is used. The direct gear is commonly used when pulling up a hill, but may also be used at cruising speed. When running the vehicle in the direct gear, parts of the transmission, such as any overdrive gears are not driven, which reduces power loss and the need for lubrication. When required by the electronic control unit, the lubrication pump is driven by the first input shaft by at least partly engaging the first clutch unit. The invention as described in this and the above examples is preferably a commercial vehicle, such as a truck, a bus or a work vehicle.

The invention further relates to a method for operating a vehicle transmission in a vehicle. As indicated above, the transmission comprises a first transmission mechanism arranged to transmit mechanical driving power from an output shaft of at least one prime mover to a first input shaft and to put any one of a first set of gears in an engaged state to drivingly connect the first input shaft to the driving wheels, and a second transmission mechanism arranged to transmit mechanical driving power from the output shaft of the prime mover to a second input shaft and to put any one of a second set of gears in an engaged state to drivingly connect the second input shaft to the driving wheels. The transmission further comprises a controllable first clutch unit arranged to bring the output shaft of the prime mover and the first input shaft into engagement with each other, and a controllable second clutch unit arranged to brine the output shaft of the prime mover and the second input shaft into engagement with each other. As indicated above, the prime mover can be an internal combustion engine and/or an electric motor. A lubrication pump is drivingly connected to the first input shaft to lubricate the transmission and an electronic control unit is arranged to determine a lubricated state of the transmission and the operational state of the lubrication pump.

The method comprises the steps of:
registering the operational state of the first and second clutches and the lubrication pump,
driving the first input shaft and the lubrication pump by at least partly engaging the first clutch unit, when it is registered that the second clutch unit is engaged.

As indicated above, the electronic control unit is used for registering the operational state of the first and second clutches and the lubrication pump. The electronic control unit is also used for controlling the operation of the lubrication pump by at least partly engaging the first clutch unit According to a first example, the method involves partly engaging the first clutch unit in a continuous slipping mode to drive the pump. The degree of slip can be controlled in response to the determined lubricated state of the transmission. Depending on the lubrication state the degree of slip can be controlled to drive the pump at a predetermined speed, or at a continuously variable speed that is adjusted with the lubrication requirement.

According to a second example, the method involves partly engaging the first clutch unit in an intermittent mode to drive the pump. The electronic control unit can be arranged to control the rate of intermittent operation, that is, the duration and/or the frequency of clutch actuation, in response to the determined lubricated state of the transmission. The flow of lubricant supplied by the pump can be varied by control of the duration and/or frequency of clutch actuation.

The method can also comprise the farther steps of:
detecting the lubricated state of the transmission;
detecting if the first or the second clutch unit is actuated to connect the output shaft of the prime mover to the second input shaft; and, if it is detected that lubrication is required and that the second clutch is actuated,
controlling the first clutch unit to at least partly engage the first clutch to drive the pump.

The method described above is particularly useful for driving the lubrication pump using the first input shaft by at least partly engaging the first clutch unit when the second clutch unit is engaged to drivingly connect the second input shaft to the driving wheels in a direct gear. When running the vehicle in the direct gear, parts of the transmission, such as any overdrive gears are not driven, which reduces power loss and the need for lubrication. This will improve efficiency, but will cause the lubrication pump to stop when the first input shaft is not in use. Consequently, when lubrication is required, the lubrication pump can be operated using the above method.

The present invention also relates to a computer program, computer program product and a storage medium for a computer, all to be used with a computer for executing the method as described in any one of the above examples. The computer program comprises program code means for performing all the steps of the above method when said program is ran on a computer. The computer program product comprises program code means stored on a computer readable medium for performing all steps of anyone of the above method when said program product is run on a computer. The storage medium, such as a computer memory or a non-volatile data storage medium, is intended for use in a computing environment, the memory comprising a computer readable program code to perform the method.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
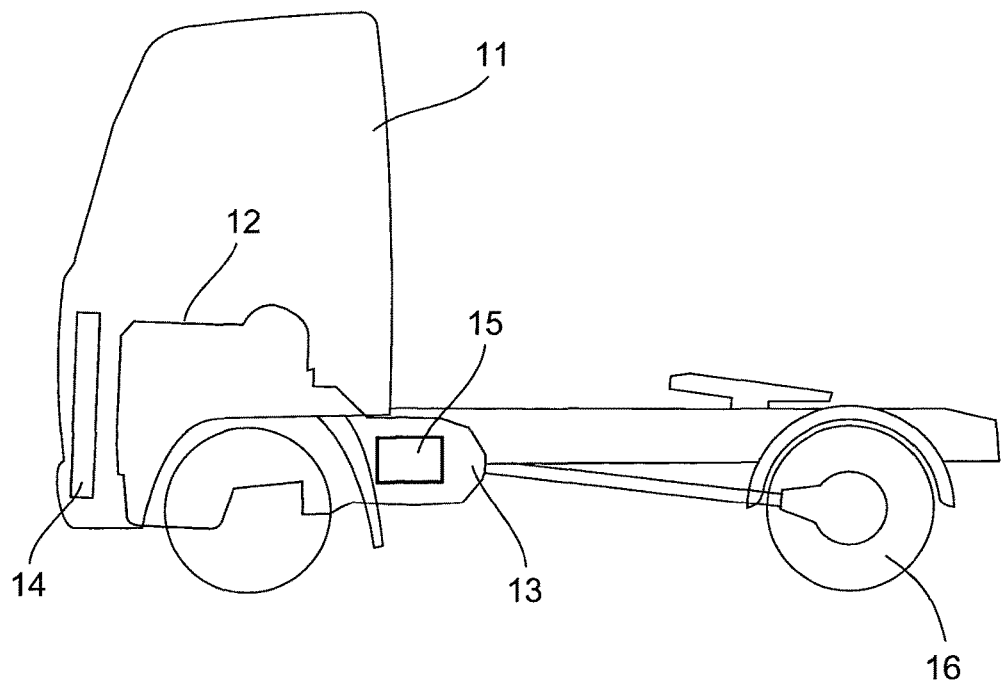
FIG. 1 shows a schematically indicated vehicle for use with the method according to the invention.

FIG. 1 shows a schematically indicated vehicle 11 with a transmission arrangement for use with a method according to the invention. The vehicle 11 is provided with art internal combustion engine (ICE) 12 as a prime mover connected to a transmission 13, such as an automated manual transmission (AMT), for transmitting torque to a vehicle drive axle not shown). The ICE 12 is connected to a radiator arrangement 14 for cooling engine coolant and oil from the ICE 12. The transmission 13 is controlled by the driver or automatically via an electronic control unit (ECU) 15. The ECU 15 is provided with control algorithms for controlling the transmission independently during, for instance, an engine start requested by the driver. The transmission is controlled to select a gear ratio between the engine 12 and a pair of driven wheels 16.

Figure 2:
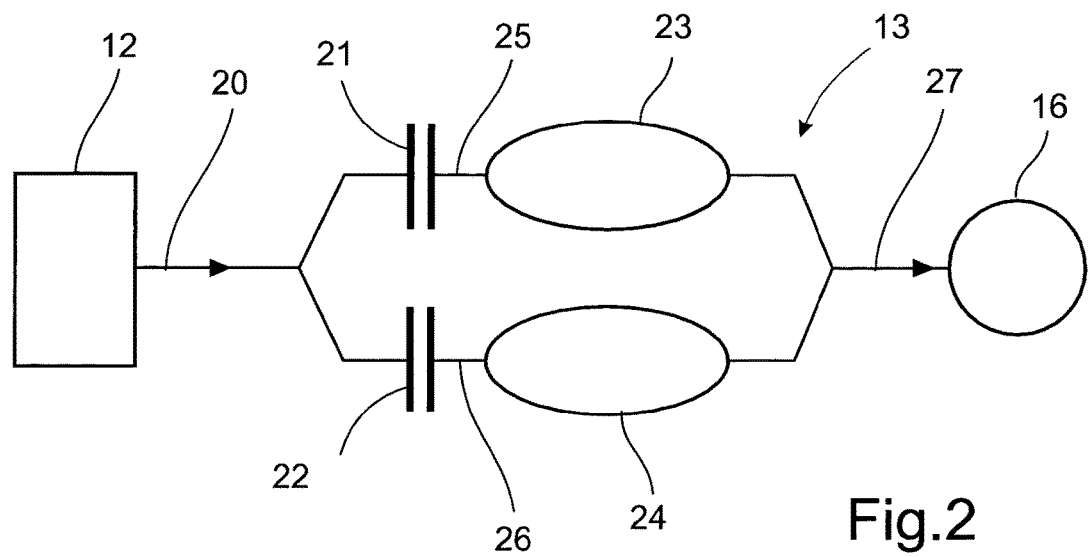
FIG. 2 shows a schematically indicated transmission for use with the method according to the invention.

FIG. 2 shows a schematic diagram of a transmission arrangement suitable for use in a vehicle as indicated in FIG. 1. The engine 12 has an output shaft 20 that is connected to the transmission 13. The transmission 13 comprises a dual clutch arrangement having a first and a second clutch unit 21, 22, respectively. The first clutch unit 21 is controlled by the electronic control unit 15 (FIG. 1) to connect the output shaft 20 to a first gearbox unit 23, comprising a first input shaft 25, an output shaft and a number of gears (not shown) that can be actuated for controlling the gear ratio between the engine 12 and the driven wheels 16. A lubrication pump (not shown) is provided in the first gearbox unit 23 and is drivingly connected to the first clutch unit 21. Similarly, the second clutch unit 22 can be controlled to connect the output shaft 20 to a second gearbox unit 24, comprising a second input shaft 26, an output shaft and a number of gears (not shown) that can be actuated for controlling said gear ratio. The mechanical design of the first and second gearbox units 23, 24 is not part of the invention per se and will not be described in further detail. Using the first and second clutch units 21, 22 in turn, the gears of the first and second gearbox units 23, 24 can be used for driving the wheels 16 via a drive shaft 27.

The electronic control unit 15 is connected to a number of existing sensors (not shown) for detecting and monitoring the lubrication of each clutch unit and the shafts and gears of the transmission. Examples of sensors are temperature sensors for measuring oil temperature and/or bearing temperature, oil level sensors for monitoring oil levels, oil pressure sensors for monitoring oil pressure, as well as other suitable sensors for determining the lubricated state of the transmission. These sensors can be arranged to monitor the said parameters in one or more locations. Data collected by the electronic control unit 15 is used as a basis for determining the lubricated state, and if the lubrication pump is not currently driven, for determine whether the first clutch unit should be operated to operate the pump.

Figure 3:
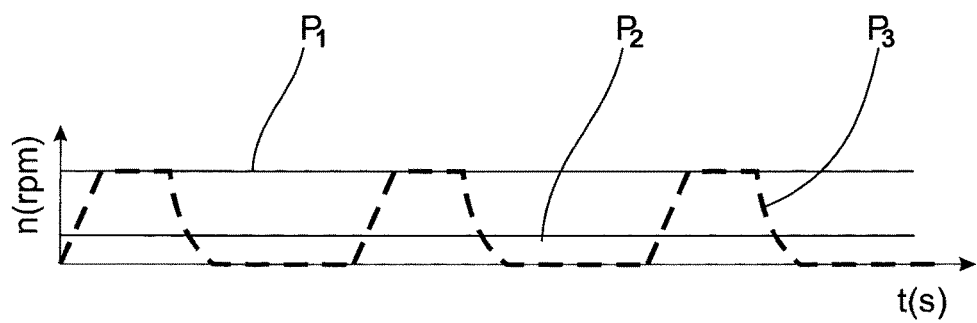
FIG. 3 shows a schematic diagram indicating clutch actuation over time during operation of a lubrication pump.

FIG. 3 shows a schematic diagram indicating clutch actuation for the first clutch unit in a dual clutch transmission. In FIG. 3, clutch actuation is plotted as a function of the rotational speed n (rpm) of the first clutch unit over time t (s) in a vehicle travelling at a constant speed. With reference to FIG. 2, when the first clutch unit 21 is engaged to connect the output shaft 20 of the internal combustion engine 12 to the first input shaft 25, the lubrication pump is driven by the first input shaft 25. In this case lubrication of the transmission is being carried out as normal and the pump speed is constant and equal to the rotational speed of the input shaft, as indicated by the upper line P1 in FIG. 3.

When the second clutch unit 22 is engaged to connect the output shaft 20 of the internal combustion engine 12 to the second input shaft 26, then the first input shaft 25 and the associated lubrication pump are not driven by the output shaft 20 of the internal combustion engine 12. If the electronic control unit determines that the lubricated state of the transmission is insufficient, then the lubrication pump is driven by the first input shaft 25 by at least partly engaging the first clutch unit 21.

According to a first example, the method involves partly engaging the first clutch unit 21 in a continuous slipping mode to drive the pump, as indicated by the lower line P2 in FIG. 3. In this case the pump is operated by maintaining the speed at approximately 25% of the speed of the first clutch unit when fully engaged. However, the degree of slip can be controlled in response to the determined lubricated state of the transmission. Depending on the lubrication state the degree of slip can be controlled to drive the pump at a predetermined speed, or at a continuously variable speed that is adjusted with the lubrication requirement.

According to a second example, the method involves partly engaging the first clutch unit 21 in an intermittent mode to drive the pump, as indicated by the dashed line P3 in FIG. 3. In this case the pump is operated by bringing the speed up to the speed of the first clutch unit at regular interval. However, the electronic control unit can be arranged to control the rate of intermittent operation, that is, the duration and/or the frequency of clutch actuation, in response to the determined lubricated state of the transmission. The flow of lubricant supplied by the pump can be varied by control of the duration and/or frequency of clutch actuation.

Figure 4:
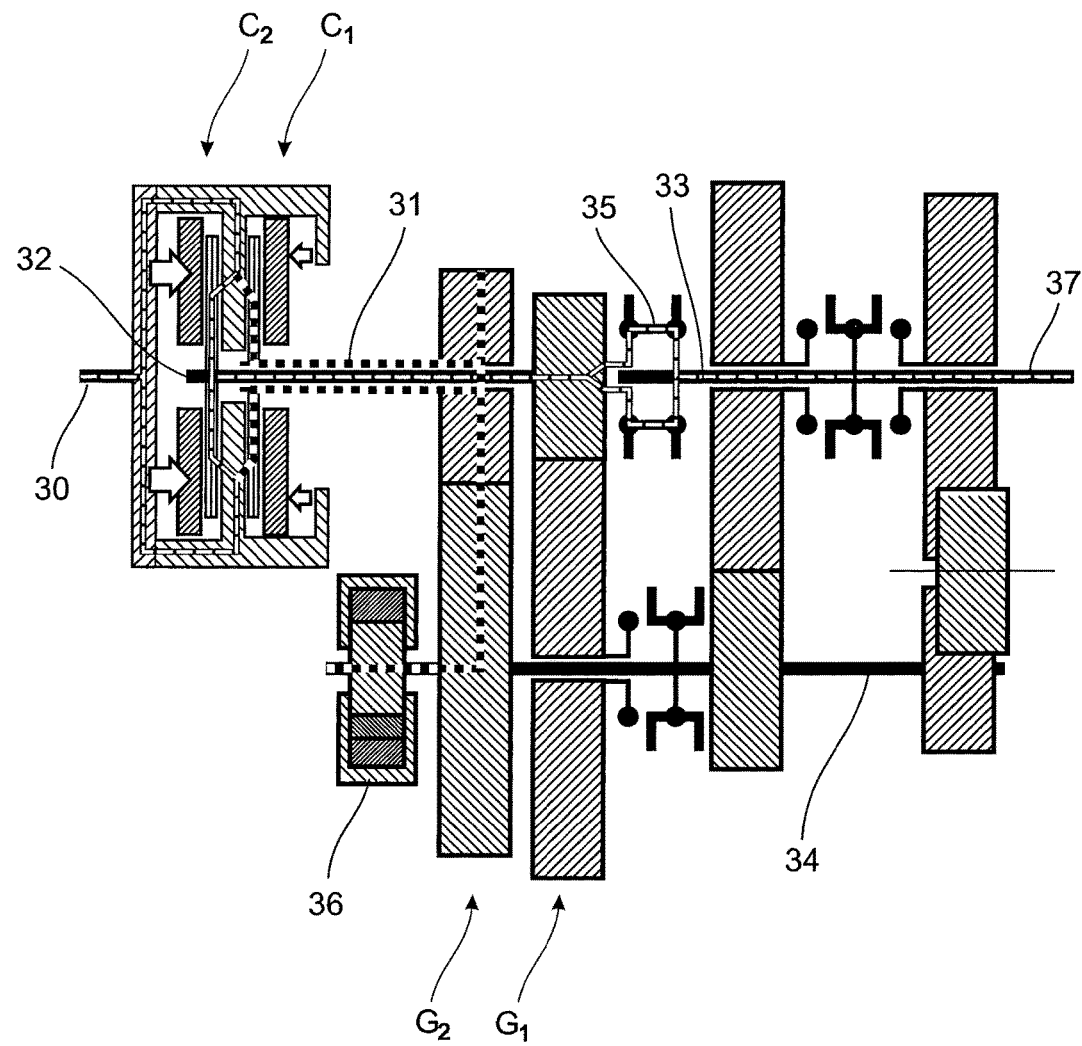
FIG. 4 shows a schematic transmission arrangement according to a first embodiment of the invention.

FIG. 4 shows a schematic cross-section of a transmission arrangement according to a first embodiment of the invention. In this embodiment, the transmission is described as being operated at cruising speed in a direct gear using the second clutch unit.

The transmission arrangement is connected between the output shaft 30 of a prime mover (not shown; see FIG. 2) and a drive shaft 37, which drive shaft is drivingly connectable to at least one pair of driving wheels (not shown). In this example the transmission arrangement comprises a dual-clutch transmission connectable between the crankshaft and the drive shaft. The dual-clutch transmission comprises multiple rotatable components for transmitting power from the engine to the driving wheels. The dual-clutch transmission has a first and a second input shaft 31, 32 of which the first input shaft 31 is a hollow shaft connected to a first clutch unit C1 and the second input shaft 32 is a solid shaft connected to a second clutch unit C2. The first input shaft 31 is co-axially supported by the second input shaft 32. The dual-clutch transmission further comprises a transmission output shaft 33 and at least a first countershaft 34 which are drivingly connectable to the clutch units C1, C2 by means of a number of manually and/or automatically selectable gears using actuators.

In this example, the transmission is shown connecting the second clutch unit C2 to the drive shaft 37 in a direct gear, that is, without the use of any intermediate gear wheels. This is achieved by connecting the second input shaft 32 directly to the transmission output shaft 33 via an actuator. This causes the gear wheels for the first gear set G1 to be rotated, but the relevant gear wheels will merely be freewheeling.

At this time an electronic control unit (FIG. 1) arranged to monitor the lubricated state of the transmission can determine that lubrication is required. In FIG. 4, a lubrication pump 36 on a countershaft 34 is drivingly connected to the first clutch unit C1 and the first input shaft 31 via the second gear set G2. As the first clutch unit is not actuated, the lubrication pump 36 is not being driven. In order to lubricate the transmission while the second clutch unit C2 is actuated, the electronic control unit (FIG. 1) generates a signal causing partial engagement of the first clutch unit C1 in a continuous slipping operation to drive the lubrication pump 36 at a desired speed. The electronic control unit can be arranged to control the degree of slip in response to the determined lubricated state of the transmission, allowing the pump to be driven at a constant or a variable speed depending on the lubrication requirement.

Figure 5:
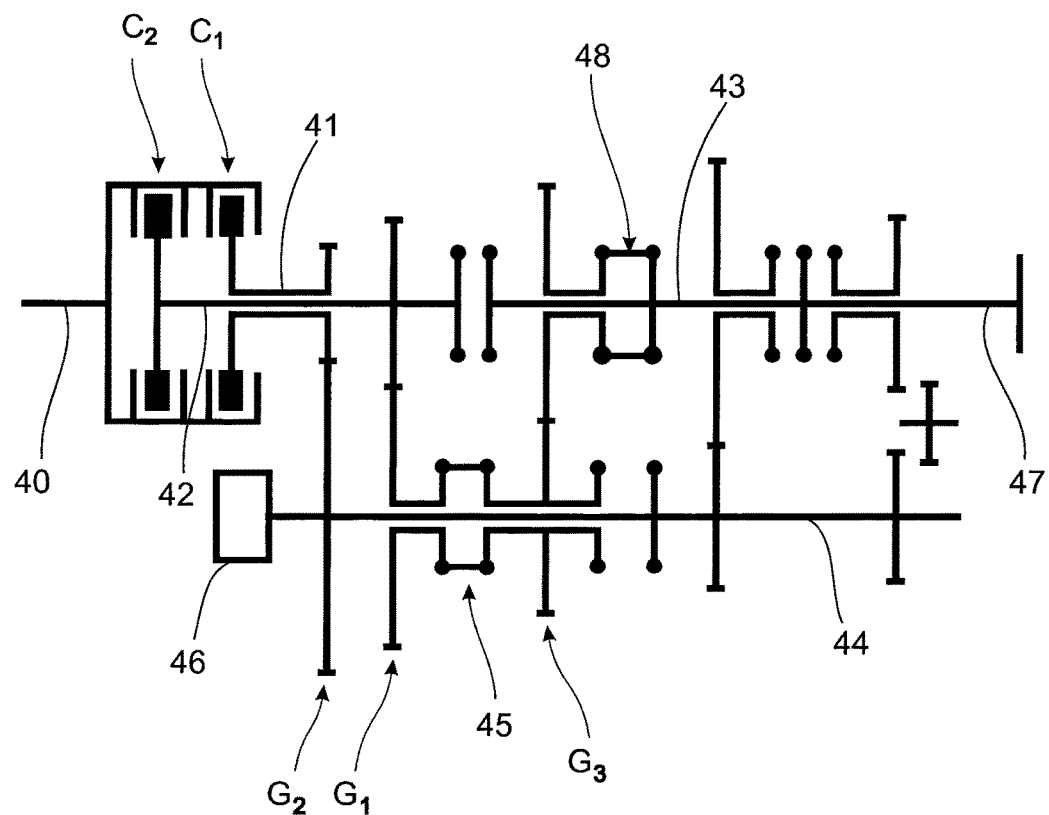
FIG. 5 shows schematic transmission arrangement according to a first embodiment of the invention.

FIG. 5 shows schematic transmission arrangement according to a second embodiment of the invention in this embodiment, the transmission is described as being operated in an intermediate gear using the second clutch unit.

The transmission arrangement is connected between the output shaft 40 of a prime mover (not shown; see FIG. 2) and a drive shaft 47, which drive shaft is drivingly connectable to at least one pair of driving wheels (not shown). In this example the transmission arrangement comprises a dual-clutch transmission connectable between the output shaft 40 of the engine and the drive shaft 47. The dual-clutch transmission comprises multiple rotatable components for transmitting power from the engine to the driving wheels. The dual-clutch transmission has a first and a second input shaft 41, 42 of which the first input shaft 41 is a hollow shaft connected to a first clutch unit C1 and the second input shaft 42 is a solid shaft connected to a second clutch unit C2. The first input shaft 41 is co-axially supported by the second input shaft 42. The dual-clutch transmission further comprises a transmission output shaft 43 and at least a first countershaft 44 which are drivingly connectable to the clutch units C1, C2 by means of a number of manually and/or automatically selectable gears using actuators.

In this example, the transmission is shown connecting the second clutch unit C2 to the drive shaft 47 in third gear. This is achieved by connecting the second input shaft 42 to the gear wheels for the first gear set G1. The gear wheels for the first gear set G1 are connected to the gear wheels for the third gear set G3 by controlling a first actuator 45. In the shown example, the gear wheels of the first gear set G1 and the third gear set G3 supported on the countershaft are freewheeling relative to the countershaft. The gear wheels for the third gear set G3 are connected to the transmission output shaft 43 via a second actuator 48. The gear wheels of the third gear set G3 supported on the transmission output shaft 33 are then in driving connection with the output shaft 43 in order to rotate the drive shaft 47.

At this time an electronic control unit (FIG. 1) arranged to monitor the lubricated state of the transmission can determine that lubrication is required. In FIG. 5, a lubrication pump 46 on a countershaft 44 is drivingly connected to the first clutch unit C1 and the first input shaft 41 via the second gear set G2. As the first clutch unit is not actuated, the lubrication pump 46 is not being driven. In order to lubricate the transmission while the second clutch unit C2 is actuated, the electronic control unit (FIG. 1) generates a signal causing partial engagement of the first clutch unit C1 in a continuous slipping operation to drive the lubrication pump 46 at a desired speed. The electronic control unit can be arranged to control the degree of slip in response to the determined lubricated state of the transmission, allowing the pump to be driven at a constant or a variable speed depending on the lubrication requirement.

Alternatively, the first clutch unit C1 in the above embodiments is engaged intermittently to drive the pump. The electronic control unit can be arranged to control the rate of intermittent operation, that is, the duration and/or the frequency of clutch actuation, in response to the determined lubricated state of the transmission. The flow of lubricant supplied by the pump can be varied by control of the duration and/or frequency of clutch actuation.

The present invention also relates to a computer program, computer program product and a storage medium for a computer all to be used with a computer for executing the method as described in any one of the above examples.

Figure 6:
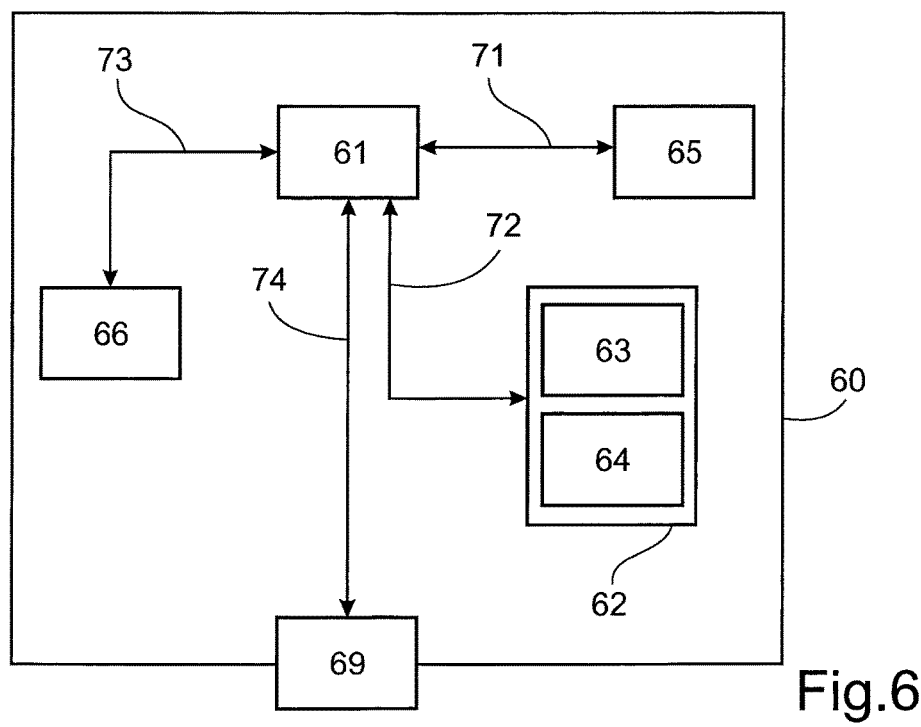
FIG. 6 shows the invention applied on a computer arrangement.

FIG. 6 shows an apparatus 60 according to one embodiment of the invention, comprising a non-volatile memory 62, a processor 61 and a read and write memory 66. The memory 62 has a first memory part 63, in which a computer program for controlling the apparatus 60 is stored. The computer program in the memory part 63 for controlling the apparatus 60 can be an operating system.

The apparatus 60 can be enclosed in, for example, a control unit, such as the control unit 15 in FIG. 1. The data-processing unit 61 can comprise, for example, a microcomputer.

The memory 62 also has a second memory part 64, in which a program for controlling the target gear selection function according to the invention is stored. In an alternative embodiment, the program for controlling the transmission is stored in a separate non-volatile storage medium 65 for data, such as, a CD or an exchangeable semiconductor memory. The program can be stored in an executable form or in a compressed state.

When it is stated below that the data-processing unit 61 runs a specific function, it should be clear that the data-processing unit 61 is running a specific part of the program stored in the memory 64 or a specific part of the program stored in the non-volatile storage medium 65.

The data-processing unit 61 is tailored for communication with the storage medium 65 through a first data bus 71. The data-processing unit 61 is also tailored for communication with the memory 62 through a second data bus 72. In addition, the data-processing unit 61 is tailored for communication with the memory 66 through a third data bus 73. The data-processing unit 61 is also tailored for communication with a data port 69 by the use of a fourth data bus 74.

The method according to the present invention can be executed by the data-processing unit 61, by the data-processing unit 61 running the program stored in the memory 64 or the program stored in the non-volatile storage medium 65.

The invention should not be deemed to be limited to the embodiments described above, but rather a number of further variants and modifications are conceivable within the scope of the following patent claims. For instance, the detailed description comprises a preferred embodiment of the invention relating to a vehicle transmission using a one prime mover in the form of an internal combustion engine. However, the invention is equally applicable to electric vehicles and hybrid vehicles comprising an internal combustion engine and an electric motor. Also, the examples according to FIGS. 1 and 2 are directed to a commercial vehicle of the tractor-trailer type. However, the invention as outlined in the remaining figures can also be applied to trucks without trailers as well as articulated trucks.

The invention claimed is:

1. A vehicle transmission comprising at least one prime mover, the transmission comprising; a first transmission mechanism arranged to transmit mechanical driving force power from an output shaft of the prime mover to a first input shaft and to put any one of a first set of gears in an engaged state to drivingly connect the first input shaft to the driving wheels; a second transmission mechanism arranged to transmit mechanical driving force power from the output shaft of the prime mover to a second input shaft and to put any one of a second set of gears in an engaged state to drivingly connect the second input shaft to the driving wheels; a controllable first clutch unit arranged to bring the output shaft of the prime mover and the first input shaft into engagement with each other; a controllable second clutch unit arranged to bring the output shaft of the prime mover and the second input shaft into engagement with each other, a lubrication pump drivingly connected to the first input shaft to lubricate the transmission; and an electronic control unit arranged to control the transmission, wherein the electronic control unit is arranged to register the operational state of the first and second clutches and the lubrication pump, and when it is registered that the second clutch unit is engaged, the electronic control unit is arranged to at least partly engaging the first clutch unit, in order to drive the first input shaft and the lubrication pump.

2. Vehicle transmission according to claim 1, wherein the first clutch unit is arranged to be partly engaged in a continuous slipping operation to drive the lubrication pump.

3. Vehicle transmission according to claim 2, wherein the electronic control unit is arranged to control the degree of slip in response to a determined lubricated state of the transmission.

4. Vehicle transmission according to claim 2, wherein the electronic control unit is arranged to control the degree of slip to drive the lubrication pump at a predetermined speed.

5. Vehicle transmission according to claim 1, wherein the first clutch unit is arranged to be engaged intermittently to drive the lubrication pump.

6. Vehicle transmission according to claim 5, wherein the electronic control unit is arranged to control the rate of intermittent operation in response to a determined lubricated state of the transmission.

7. Vehicle transmission according to claim 1, wherein the electronic control unit is arranged to determine the lubricated state of the transmission.

8. Vehicle transmission according to claim 7, wherein the electronic control unit is connected to at least one sensor and is arranged to determine the lubricated state in response to signals from the at least one sensor.

9. Vehicle transmission according to claim 8, wherein the at least one sensor comprises a temperature sensor for measuring oil temperature and/or bearing temperature.

10. Vehicle transmission according to claim 8, wherein the at least one sensor comprises an oil level sensor for monitoring oil levels.

11. Vehicle transmission according to claim 8, wherein the at least one sensor comprises an oil pressure sensors for monitoring oil pressure.

12. Vehicle transmission according to claim 1, wherein the electronic control unit is arranged to at least partly engaging the first clutch unit, in order to drive the first input shaft and the lubrication pump when the second clutch unit is engaged to drivingly connect the second input shaft to the driving wheels in a direct gear.

13. Vehicle transmission according to claim 1, wherein the vehicle is a commercial vehicle.

14. Method for operating a vehicle transmission in a vehicle, the transmission comprising a first transmission mechanism arranged to transmit mechanical driving force power from an output shaft of a prime mover to a first input shaft and to put any one of a first set of gears in an engaged state to drivingly connect the first input shaft to the driving wheels; a second transmission mechanism arranged to transmit mechanical driving force power from the output shaft of the prime mover to a second input shaft and to put any one of a second set of gears in an engaged state to drivingly connect the second input shaft to the driving wheels; a controllable first clutch unit arranged to bring the output shaft of the prime mover and the first input shaft into engagement with each other; a controllable second clutch unit arranged to bring the output shaft of the prime mover and the second input shaft into engagement with each other, a lubrication pump drivingly connected to the first input shaft to lubricate the transmission; and an electronic control unit arranged to control the transmission,
comprising:
registering the operational state of the first and second clutches and the lubrication pump,
driving the first input shaft and the lubrication pump by at least partly engaging the first clutch unit (21; C1), when it is registered that the second clutch unit is engaged.

15. Method according to claim 14, comprising partly engaging the first clutch unit in a continuous slipping mode to drive the lubrication pump.

16. Method according to claim 15, comprising controlling the degree of slip in response to a determined lubricated state of the transmission.

17. Method according to claim 15, comprising controlling the degree of slip to drive the lubrication pump at a predetermined speed.

18. Method according to claim 14, comprising partly engaging the first clutch unit in an intermittent mode to drive the lubrication pump.

19. Method according to claim 18, comprising controlling the rate of intermittent operation in response to a determined lubricated state of the transmission.

20. Method according to claim 14, comprising
detecting the lubricated state of the transmission;
detecting if the second clutch unit is actuated; and
controlling the first clutch unit to at least partly engage the first clutch to drive the lubrication pump if it is detected that lubrication is required.

21. Method according to claim 14, comprising driving the lubrication pump using the first input shaft by at least partly engaging the first clutch unit when the second clutch unit is engaged to connect the second input shaft to the driving wheels in a direct gear.

22. A computer comprising a program for performing all the steps of claim 14 when the program is run on the computer.

23. A computer program product comprising program code stored on a non-transitory computer readable medium for performing all steps of claim 14 when the program product is run on a computer.

24. A non-transitory storage medium for use in a computing environment, the storage medium comprising a computer readable program code to perform the method of claim 14.

* * * * *